United States Patent [19]

Cantrell, Jr.

[11] 4,113,005
[45] Sep. 12, 1978

[54] WASTE HEAT BOILER TEMPERATURE CONTROL SYSTEM

[75] Inventor: Clifford J. Cantrell, Jr., Tulsa, Okla.

[73] Assignee: John Zink Company, Tulsa, Okla.

[21] Appl. No.: 789,939

[22] Filed: Apr. 22, 1977

[51] Int. Cl.² ............................................. F22D 1/16
[52] U.S. Cl. .................................. 165/40; 122/7 A; 122/7 R
[58] Field of Search ................ 122/7 R, 7 A; 165/40, 165/35

[56] References Cited

U.S. PATENT DOCUMENTS

| | | | |
|---|---|---|---|
| 1,050,134 | 1/1913 | Hegeler | 122/7 R |
| 1,707,964 | 4/1929 | McKelvy et al. | 122/7 R |
| 2,060,290 | 11/1936 | Ebner | 122/7 R |
| 3,395,512 | 8/1968 | Finney et al. | 122/7 A |

*Primary Examiner*—Charles J. Myhre
*Assistant Examiner*—Margaret A. LaTulip
*Attorney, Agent, or Firm*—Head, Johnson & Chafin

[57] ABSTRACT

A waste heat recovery system which can be attached to, and made part of, an existing thermal oxidizer-stack system, at minimum cost, without reducing the reliability of the existing oxidizer-stack system. It comprises a conventional heat transfer means, which is connected at its input through a refractory lined first conduit, to an opening through the wall of the first stack of the thermal oxidizer-stack system. The outlet of the heat exchanger is connected through a second conduit to an induced draft means, which can be a conventional blower, the outlet of which is connected to a second stack. The action of the induced draft blower is to cause inflow of hot stack gases through the first conduit and through the heat exchanger and to pass the cooled stack gases out the second stack. A first temperature sensor is placed in the stack between the inlet from the thermal oxidizer and the opening where the gases are drawn into the first conduit. A second thermal sensor is placed in the first conduit. A differential temperature controller is provided responsive to the first and second thermal sensors and the rate of flow of hot gases to the waste heat recovery system is controlled by the differential temperature.

3 Claims, 1 Drawing Figure

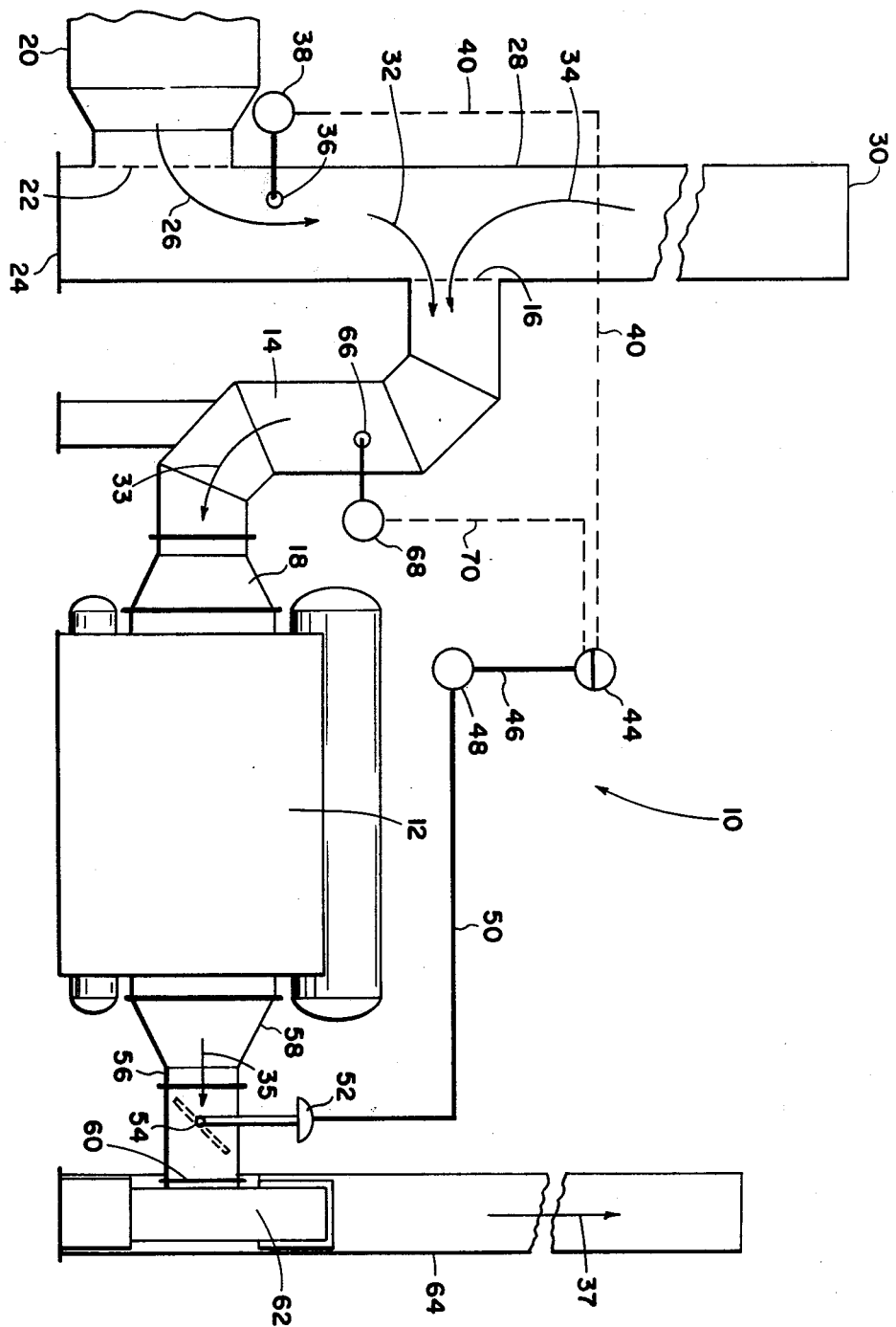

WASTE HEAT BOILER TEMPERATURE CONTROL SYSTEM

BACKGROUND OF THE INVENTION

1. Field of the Invention

This invention lies in the field of the heat recovery devices.

More particularly it concerns the use of waste heat recovery from the hot products of combustion from furnaces, thermal oxidizers, etc.

Still more particularly it concerns a shunt system for waste heat recovery which utilizes a heat exchanger and means for inducing the flow of stack gases through the heat exchanger and, passing the cooled gases through an induced draft fan or blower, and up a second stack.

2. Description of the Prior Art

In view of the current great interest, and economic advantages, in the conservation of fuel, and the latent heat of exhaust gases from furnaces and other high temperature systems, it is important to recover as much as possible of the latent heat in the hot stack gases from boilers, that pass up the stacks. There are many ways in the prior art for recovery of this latent heat of the stack gases. Most of these involve major construction in the way of heat exchangers of special designs, built into the boiler or stack structure themselves. These can be very expensive. They can be still more expensive when they are added to an existing structure.

Also, when such heat exchangers are inserted into the lower portion of the stack, they increase the pressure drop and therefore lessen the draft in the stack, and may require an increased height to the stack, or some sort of induced draft means, which are very costly.

Furthermore, if anything should go wrong with the heat exchanger that is built into the stack, the entire boiler and furnace system must be shut down while repairs are made to the structure inside the stack, and this shut down can be very costly.

SUMMARY OF THE INVENTION

It is a primary object of this invention to provide a thermal heat recovery system which can be applied to an existing thermal oxidizer-stack system.

It is a further object of this invention to provide a heat recovery system that can be, in effect, disconnected from the stack in case of trouble, so that the stack can always operate in a direct manner, whereby the hot products of combustion pass up the stack in a conventional manner.

These and other objects are realized and the limitations of the prior art are overcome in this invention, by providing a heat transfer system which can be connected to the first stack, which takes the hot products of combustion from a thermal oxidizer or boiler, and delivers cooled gases to a second stack. The flow of hot gases into the heat recovery system is by means of induced draft, such as by a fan or blower, which can be conventional, since the gases which contact the blower are of reduced temperature, having passed through a waste heat boiler, or the equivalent.

Means are provided to control the draft, or, in other words, control the rate of flow of stack gases from the first stack through the heat exchanger and the induced draft blower into the second stack. The purpose of this control is to provide a means for maintaining a rate of flow such that most if not all of the hot products of combustion are drawn into the heat exchanger system, with a minimum, selected amount, of cold atmospheric air being drawn into the top of the first stack. To determine when this condition exists, thermal sensors are provided in the first stack and in the first conduit leading from the stack, to the heat exchanger.

The first thermal sensor is positioned in the first stack between the inlet at the base of the stack, from the thermal oxidizer, and the point at which the stack gases are drawn into the conduit leading to the heat exchanger system. This sensor measures the temperature of the products of combustion. There is a second sensor in the conduit through which the gas is passed from the first stack to the heat exchanger. The rate of flow of hot gases is controlled by means of a controller sensitive to the difference between the two temperatures of the first and second sensors, so that the second sensor will be a selected small temperature difference (e.g. 5°–40° F.) below the temperature indicated by the first sensor. This insures that a selected small amount of atmospheric air flows into the top of the first stack and becomes part of the input to the heat exchanger system. Therefore, substantially all of the hot products of combustion then flow through the shunt heat exchanger system, and up the second stack.

In the event that there is a fault or trouble with the shunt heat transfer system, the draft can be cut off and all stack gases then will flow directly up the first stack, as in a conventional system.

BRIEF DESCRIPTION OF THE DRAWINGS

These and other objects and advantages of this invention and a better understanding of the principles and details of the invention will be evident from the following description taken in conjunction with the appended drawing which represents one embodiment of this invention.

DESCRIPTION OF THE PREFERRED EMBODIMENT

Referring now to the drawing, there is shown one embodiment of this invention, indicated generally by the numeral 10.

There is a conventional thermal oxidizer or furnace 20 with an outlet 22 which is connected to a stack 28 at a point near the base 24 of the stack. Normally all of the hot products of combustion from the thermal oxidizer flow up the stack in accordance with arrow 26, and then upwardly to the top 30 of the stack, and to the atmosphere. This flow of hot gases, which may be in the range of 2,000° to 2,500° F., represent a great amount of latent heat which can be salvaged.

In the prior art manner, waste heat boilers would be built into the structure of the furnace and/or the stack, so that much of this heat can be extracted from the stack gases as they flow over the heat exchanger and on up the stack.

Such construction of heat exchanger piping inside of the stack is costly. Furthermore, it creates a pressure drop of the flow of hot gases, and therefore the draft of the stack is reduced, which may require an increased height to the stack, and/or other means to improve the draft.

Also, in using such devices it is necessary to provide a draft control in the stack, such as a damper, which again represents considerable expense and trouble. Such draft controls are very vulnerable to corrosion and other troubles, and the use of such dampers is avoided if at all possible.

The heat transfer system of this invention is connected to the stack at an opening 16, which is cut through the wall of the stack at a point intermediate the base 24 and the top 30. In all cases, the opening 16 must be above the opening 22 so that the inlet to the heat transfer system through a first conduit 14 will be above the point of entry of the hot gases into the stack.

The first conduit 14 is a refractory lined conduit, of suitable size, and is connected at its outlet end 18 to a heat transfer device, which can be of conventional design. The outlet of the heat transfer device, or waste heat boiler 58, is connected to a second conduit 56, which connects through an opening 60 into an induced draft blower or other means for creating an induced draft from the opening 16 into a second stack 64. Presumably the hot gases of 2,000° to 2,500° F. which enter the conduit 14 will be cooled to a temperature of about 400° to 600° so that conventional induced draft equipment, such as the blower 62, can be used to provide the draft required to shunt the flue gases, represented by arrow 26, into the first conduit in accordance with arrows 32 and 33, to the waste heat boiler 12 and in accordance with arrow 35 through the second conduit 56, past an induced draft control 54, and into the induced draft blower 62 and then up the stack 64. The draft control 54, blower 62 and stack are conventional.

While the draft control is shown as a damper 54, it can be any of the conventional types, which could involve a speed control on the motor which drives the blower 62, for example, or it could be a variation in the construction of the blower which controls the rate of flow of gas through the blower, and so on. The particular design is not critical.

If the draft induced by 62 is strong enough, it will overcome the draft caused by the length of column of the first stack 28 between the opening 16 and the top 30, and will cause a downflow of cold air from the atmosphere down into the stack in accordance with arrow 34, and into the conduit 14.

What is desired is a draft such that there will be a very small amount of cold air 34 and a substantially complete flow of hot gas 26, 32 into the conduit 14. The draft is controlled by means such as 54 and a controller 52, which is controlled by a differential temperature controller 48, through means 50. The differential temperature controller 48 is responsive to a differential temperature indicator transmitter 44 through means 46. The differential temperature transmitter 44 is responsive to the temperature indicated by the thermal sensor 36 near the base of the stack in the space between the openings 22 and 16. The temperature indicated by 36 is that of the hot products of combustion, and an appropriate signal, either electrical or pneumatic, is sent by means 38 over dashed line 40 to the differential temperature transmitter 44. There is a second thermal sensor 66 inside of the conduit 14, which provides a signal generated by the temperature transmitter 68 over dashed line 70, to the differential temperature transmitter 44. Thus, the control, at the control point 54, is responsive to the differential temperature at points 36 and 66.

If the draft is too low it will be clear that much of the hot gases 26 will go on past the opening 16 and up and out of the top 30 of the first stack 28. On the other hand if the draft is too high it will be clear that in addition to the hot gases 26 flowing like 32, 33 into the first conduit 14, there will be cold air flowing into the top of the stack in accordance with arrow 34, flowing into the conduit 14.

The control is maintained such that there will be a selected small difference in temperature between the points 36 and 66, the temperature at 66 being slightly less than that at 36. When this happens, the major part, if not all, of the hot gases 26 are passing through the conduit 14 and through the heat recovery system.

It will be clear that the system represented by the heat transfer means 12, the conduits 14 and 56, the induced draft means 62 and stack 64, can all be provided and attached simply to an existing stack system. Furthermore, it will be clear that if any part of the system 10 becomes inoperative and must be shut down then by shutting off the induced draft, such as by shutting off the blower, or closing the draft control means 54, or other conventional means, there will be not tendancy for flow of gases 32 or 34 into the conduit 14 and the stack 28 will act as a conventional stack system. Thus, any down time in the heat transfer system 10 does not effect the operation of the thermal oxidizer stack system.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. In a thermal oxidizer stack system, including a first stack connected through a first opening near its base to the outlet of said thermal oxidizer, the hot products of combustion or stack gases passing up said stack, apparatus for recovery of the waste latent heat in said hot stack gases, comprising;
   (a) heat exchanger means having an inlet and an outlet;
   (b) sais inlet to said heat exchanger means connected by first conduit means through a second opening in the wall of said stack to the interior thereof, at a selected point intermediate the base and top of said stack, but always above said first opening;
   (c) the outlet of said heat exchanger means connected through second conduit means to induced draft means;
   (d) second stack means connected to the outlet of said induced draft means;
   (e) first temperature indicator means responsive to the temperature inside said stack below said second opening in said stack;
   (f) second temperature indicator means responsive to the temperature of the gases in said first conduit means; and
   (g) control means responsive to the differential temperature indication of said first and second indicators to control the rate of flow of stack gases from said first stack through said heat exchanger means, to, and up said second stack means.

2. The system as in claim 1 in which said control operates to maintain a selected small value of temperature difference between said first and second temperature indicators.

3. The system as in claim 2 in which said selected small temperature difference lies in the range of 5° to 40° Fahrenheit.

* * * * *